(12) United States Patent
Miess et al.

(10) Patent No.: US 9,770,807 B1
(45) Date of Patent: Sep. 26, 2017

(54) NON-CYLINDRICAL POLYCRYSTALLINE DIAMOND COMPACTS, METHODS OF MAKING SAME AND APPLICATIONS THEREFOR

(75) Inventors: David P. Miess, Highland, UT (US); Mark P. Chapman, Provo, UT (US); Steven L. Choate, Spanish Fork, UT (US); D. Bart Crockett, Mapleton, UT (US); Jeffery A. Gerber, Springville, UT (US); Jair J. Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 1150 days.

(21) Appl. No.: 12/558,939

(22) Filed: Sep. 14, 2009

Related U.S. Application Data

(60) Provisional application No. 61/157,611, filed on Mar. 5, 2009.

(51) Int. Cl.
*B24D 18/00* (2006.01)
*B24D 3/00* (2006.01)

(52) U.S. Cl.
CPC .............. *B24D 18/00* (2013.01); *B24D 3/00* (2013.01)

(58) Field of Classification Search
CPC .. E21B 10/5673; E21B 10/5676; E21B 10/55; E21B 10/567; B24D 3/06; B24D 18/00; B24D 18/0009; B24D 99/005; C04B 2235/427; C04B 2235/5436;
(Continued)

(56) References Cited

U.S. PATENT DOCUMENTS

| 4,268,276 A | 5/1981 | Bovenkerk |
| 4,274,900 A | 6/1981 | Mueller et al. |
| 4,410,054 A | 10/1983 | Nagel et al. |

(Continued)

FOREIGN PATENT DOCUMENTS

WO    WO9214906    9/1992

OTHER PUBLICATIONS

Vail et al., U.S. Appl. No. 12/185,457, "Methods of Fabricating Polycrystalline Diamond With a Carbonate Material Including at Least One Alkali Metal Carbonate, Polycrystalline Diamond So-Formed, and Applications Therefor" filed Aug. 4, 2008.

(Continued)

*Primary Examiner* — Shuangyi Abu Ali
(74) *Attorney, Agent, or Firm* — Dorsey & Whitney LLP

(57) ABSTRACT

Embodiments of the invention relate to non-cylindrical polycrystalline diamond compacts ("PDCs"), and methods of fabricating such non-cylindrical PDCs without substantially undercutting a cemented carbide substrate thereof from an overlying polycrystalline diamond ("PCD") table thereof. According to various embodiments, a PDC includes a PCD table including an upper surface and a table non-cylindrical lateral periphery. The PDC includes a cemented carbide substrate bonded to the PCD table. In an embodiment, the cemented carbide substrate includes a substrate non-cylindrical lateral periphery that is not substantially undercut from the table non-cylindrical lateral periphery of the PCD table. In an embodiment, the PDC includes at least one alignment feature positioned on the cemented carbide substrate and/or the PCD table.

15 Claims, 10 Drawing Sheets

(58) Field of Classification Search
CPC ........ C04B 2235/5472; C04B 2235/80; C04B 2237/363; C04B 2237/36
USPC .......................................................... 51/293
See application file for complete search history.

(56) References Cited

U.S. PATENT DOCUMENTS

| | | | |
|---|---|---|---|
| 4,468,138 A | | 8/1984 | Nagel |
| 4,560,014 A | | 12/1985 | Geczy |
| 4,629,373 A | * | 12/1986 | Hall .............................. 407/118 |
| 4,646,857 A | * | 3/1987 | Thompson .......... E21B 10/5735 175/430 |
| 4,664,705 A | | 5/1987 | Horton et al. |
| 4,738,322 A | | 4/1988 | Hall et al. |
| 4,811,801 A | | 3/1989 | Salesky et al. |
| 4,913,247 A | | 4/1990 | Jones |
| 5,016,718 A | | 5/1991 | Tandberg |
| 5,092,687 A | | 3/1992 | Hall |
| 5,120,327 A | | 6/1992 | Dennis |
| 5,135,061 A | | 8/1992 | Newton, Jr. |
| 5,154,245 A | | 10/1992 | Waldenstrom et al. |
| 5,180,022 A | | 1/1993 | Brady |
| 5,364,192 A | | 11/1994 | Damm et al. |
| 5,368,398 A | | 11/1994 | Damm et al. |
| 5,460,233 A | | 10/1995 | Meany et al. |
| 5,480,233 A | | 1/1996 | Cunningham |
| 5,544,713 A | | 8/1996 | Dennis |
| 5,725,413 A | * | 3/1998 | Malshe et al. .................. 451/41 |
| 6,521,174 B1 | * | 2/2003 | Butcher et al. ................ 419/26 |
| 6,562,462 B2 | | 5/2003 | Griffin et al. |
| 6,749,033 B2 | | 6/2004 | Griffin et al. |
| 6,793,681 B1 | | 9/2004 | Pope et al. |
| 7,493,973 B2 | | 2/2009 | Keshavan et al. |
| 8,236,074 B1 | | 8/2012 | Bertagnolli et al. |
| 2008/0023230 A1 | * | 1/2008 | Cho .............................. 175/432 |
| 2009/0173015 A1 | | 7/2009 | Keshavan et al. |

OTHER PUBLICATIONS

U.S. Appl. No. 12/717,158, Apr. 6, 2012, Office Action.
U.S. Appl. No. 12/717,158, Jul. 19, 2012, Office Action.
U.S. Appl. No. 61/157,611, Mar. 5, 2009, Gonzalez.
U.S. Appl. No. 12/717,158, Mar. 4, 2010, Gonzalez et al.
U.S. Appl. No. 12/717,158, Mar. 1, 2013, Office Action.
U.S. Appl. No. 12/717,158, Aug. 28, 2013, Office Action.
U.S. Appl. No. 14/307,835, Jun. 18, 2014, Gonzalez et al.
U.S. Appl. No. 12/717,158, Mar. 20, 2014, Notice of Allowance.
U.S. Appl. No. 12/717,158, Mar. 26, 2014, Notice of Allowability.
U.S. Appl. No. 12/717,158, Jul. 2, 2014, Issue Notification.
U.S. Appl. No. 14/307,835, Dec. 2, 2015, Office Action.
U.S. Appl. No. 14/307,835, Mar. 1, 2016, Office Action.

* cited by examiner

NON-CYLINDRICAL POLYCRYSTALLINE DIAMOND COMPACTS, METHODS OF MAKING SAME AND APPLICATIONS THEREFOR

CROSS REFERENCE TO RELATED APPLICATION

This application claims the benefit of U.S. Provisional Application No. 61/157,611 filed on Mar. 5, 2009.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate in a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. A stud carrying the PDC may also be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented-carbide substrate. A number of such cartridges may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metallic catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in the formation of a matrix of bonded diamond grains having diamond-to-diamond bonding therebetween, with interstitial regions between the bonded diamond grains being occupied by the solvent catalyst.

SUMMARY

Embodiments of the invention relate to non-cylindrical PDCs, and methods of fabricating such non-cylindrical PDCs without substantially undercutting a cemented carbide substrate thereof from an overlying PCD table bonded to the cemented carbide substrate. According to various embodiments, a PDC includes a PCD table including an upper surface and a table non-cylindrical lateral periphery. The PDC further includes a cemented carbide substrate bonded to the PCD table. In an embodiment, the cemented carbide substrate includes a substrate non-cylindrical lateral periphery that is not substantially undercut from the table non-cylindrical lateral periphery of the PCD table. In an embodiment, the PDC includes at least one alignment feature positioned on the cemented carbide substrate and/or the PCD table.

In an embodiment, a method of manufacturing a finished PDC is disclosed. The method includes forming a precursor PDC in an HPHT process. The precursor PDC comprises a PCD table including an upper surface and a table non-cylindrical lateral periphery, and a cemented carbide substrate bonded to the PCD table. The method further includes finish machining at least the substrate non-cylindrical lateral periphery to form the finished PDC.

Other embodiments include applications utilizing the disclosed non-cylindrical PDCs in various articles and apparatuses, such as rotary drill bits, bearing apparatuses, wire-drawing dies, machining equipment, twist helical drills, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to non-cylindrical PDCs, and methods of fabricating such non-cylindrical PDCs without substantially undercutting a cemented carbide substrate thereof from an overlying PCD table bonded to the cemented carbide substrate. Generally, the non-cylindrical PDCs disclosed herein may be manufactured by forming a precursor PDC that comprises a PCD table including an upper surface and a table non-cylindrical lateral periphery, and a cemented carbide substrate bonded to the PCD table that includes a substrate non-cylindrical lateral periphery. If desired, the method may further include finish machining at least the substrate non-cylindrical lateral periphery of the precursor PDC to selected final machining dimensions.

Figure 1A:
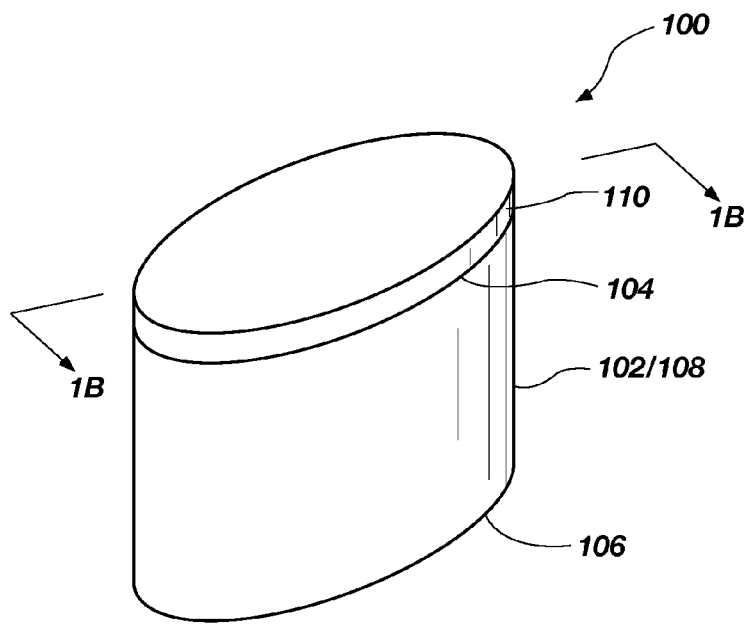
FIG. 1A is an isometric view of an assembly to be HPHT processed to form a non-cylindrical PDC according to an embodiment.

FIGS. 1A-3C described a number of different embodiments for fabricating a precursor non-cylindrical PDC that is, subsequently, subjected to finish machining. FIGS. 1A and 1B are isometric and cross-sectional views, respectively, of an assembly 100 to be HPHT processed to form a non-cylindrical PDC according to an embodiment. The assembly 100 includes a non-cylindrical cemented carbide substrate 102 including an interfacial surface 104, an opposing back surface 106, and a substrate non-cylindrical lateral periphery 108 extending therebetween. Although the interfacial surface 104 is depicted in FIGS. 1A and 1B as being substantially planar, in other embodiments, the interfacial surface 104 may exhibit a selected nonplanar topography.

The cemented carbide substrate 102 may include, without limitation, cemented carbides, such as tungsten carbide, titanium carbide, chromium carbide, niobium carbide, tantalum carbide, vanadium carbide, or combinations thereof cemented with iron, nickel, cobalt, alloys thereof, or other suitable metal-solvent catalyst. In an embodiment, the cemented carbide substrate 102 comprises cobalt-cemented tungsten carbide. The assembly 100 also includes a plurality of diamond particles 110 disposed adjacent to the interfacial surface 104 of the cemented carbide substrate 102.

Figure 1B:
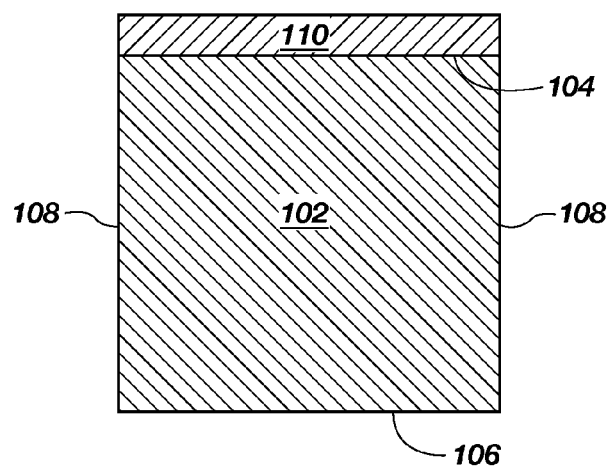
FIG. 1B is a cross-sectional view of the PDC shown in FIG. 1A taken along line 1B-1B shown in FIG. 1A.
Figure 1C:
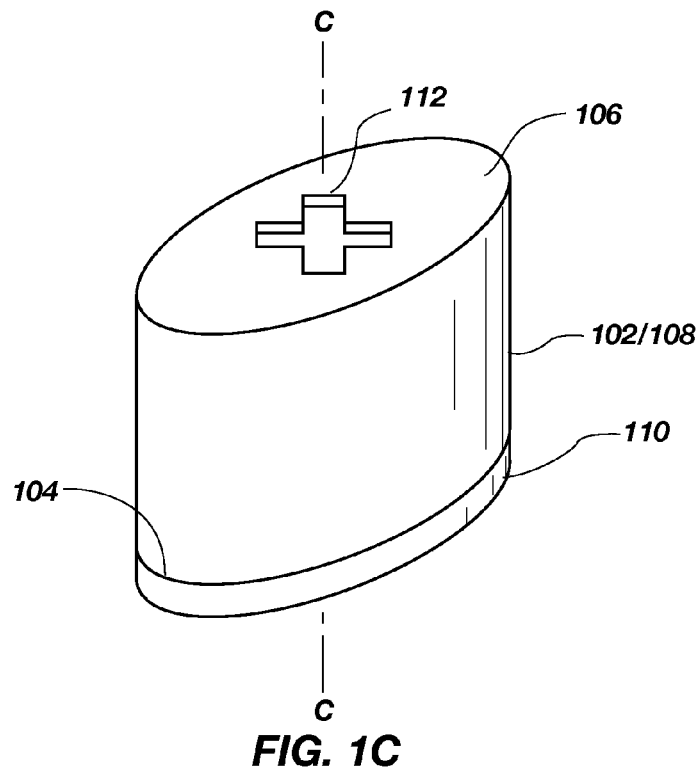
FIG. 1C is a back isometric view of the PDC shown in FIG. 1A illustrating a keyhole alignment feature formed in a back surface of a cemented carbide substrate of the assembly according to an embodiment.

Referring to FIG. 1C, in one or more embodiments, the cemented carbide substrate 102 may include at least one alignment feature formed therein, such as a keyhole 112 configured to engage with a correspondingly configured key of a machining apparatus. The keyhole 112 may be positioned on the back surface 106 and along a central axis C of the cemented carbide substrate 102 defined by the periphery 108 thereof for ease of machining a PDC to be ultimately formed by HPHT processing the assembly 100 or in another suitable position on the cemented carbide substrate 102.

Figure 1D:
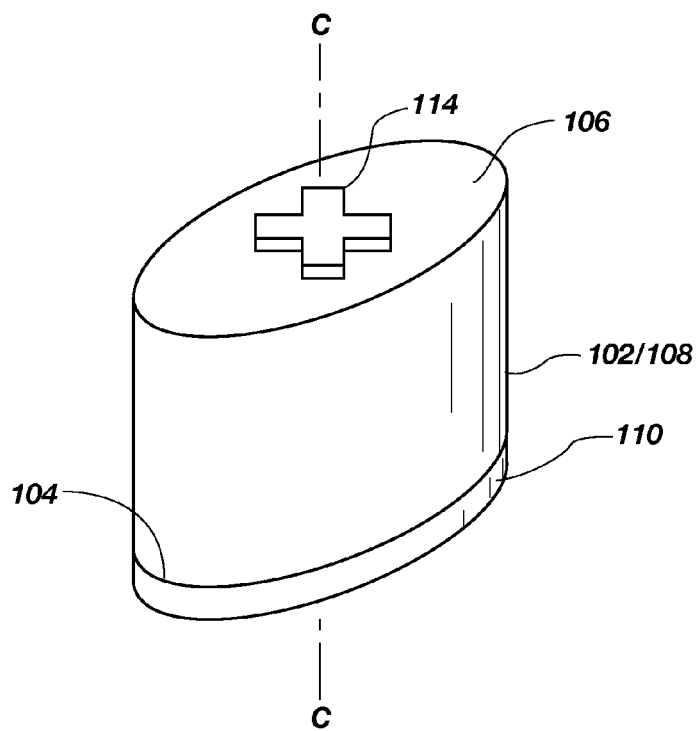
FIG. 1D is a back isometric view of the PDC shown in FIG. 1A illustrating a key alignment feature extending a back surface of a cemented carbide substrate of the assembly according to an embodiment.

Referring to FIG. 1D, in one or more embodiments, the cemented carbide substrate 102 may include at least one alignment feature extending therefrom, such as a key or projection 114 configured to engage with a correspondingly configured keyhole of a machining apparatus. The key 114 may be positioned on the back surface 106 and along a central axis C of the cemented carbide substrate 102 defined by the periphery 108 thereof for ease of machining or in another suitable position on the cemented carbide substrate 102.

The assembly 100 may be placed in a pressure transmitting medium, such as a refractory metal can embedded in pyrophyllite or other pressure transmitting medium. The pressure transmitting medium, including the diamond particles 110 and the cemented carbide substrate 102, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to infiltrate the diamond particles with a metal-solvent catalyst from the cemented carbide substrate 102. For example, the pressure of the HPHT process may be about 5 GPa to about 7 GPa and the temperature of the HPHT process may be about 1150° C. to about 1400° C. (e.g., about 1200° C. to about 1300° C.).

During the HPHT process, the metal-solvent catalyst from the cemented carbide substrate 102 (e.g., cobalt in a cobalt-cemented tungsten carbide substrate) at least partially melts and infiltrates into interstitial regions between the diamond particles 110 to catalyze formation of PCD. The PCD comprises a plurality of directly bonded-together diamond grains that defines a PCD table 202 (FIG. 2A), with the infiltrated metal-solvent catalyst disposed in the interstitial regions defined by the diamond grains. Upon cooling from the HPHT process, the metal-solvent catalyst infiltrated into the diamond particles 110 forms a strong metallurgical bond between the PCD table 202 (FIG. 2A) and the cemented carbide substrate 102.

Figure 2A:
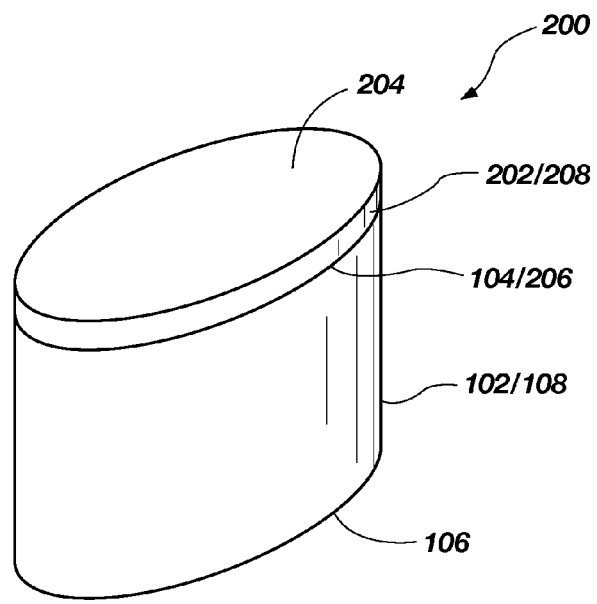
FIG. 2A is an isometric view of an embodiment of a precursor non-cylindrical PDC formed by HPHT processing the assembly shown in FIGS. 1A and 1B.

FIG. 2A is an isometric view of an embodiment of a precursor non-cylindrical PDC 200 formed by HPHT processing the assembly 100 shown in FIGS. 1A and 1B. The directly bonded-together diamond grains of the PCD table 202 exhibit diamond-to-diamond bonding (e.g., sp$^3$ bonding) therebetween. The infiltrated metal-solvent catalyst may be disposed in the interstitial regions defined by the bonded diamond grains. The PCD table 202 includes a working upper surface 204, a generally opposing interfacial surface 206 that is bonded to the cemented carbide substrate 102, and a table non-cylindrical lateral periphery 208 extending therebetween. Although the upper surface 204 is illustrated as being substantially planar, in other embodiments, the upper surface 204 may convex, concave, or another selected nonplanar geometry. It is noted that at least a portion of the periphery 208 may also function as a working surface that contacts a subterranean formation during drilling.

In some embodiments, as an alternative to or in addition to at least one alignment feature being disposed on the cemented carbide substrate 102, at least one alignment feature may be formed as part of the PCD table 202 that is configured to facilitate alignment of the PDC 200 in a machining apparatus. For example, the at least one alignment feature on the PCD table 202 may be a key or keyhole.

Figure 2B:
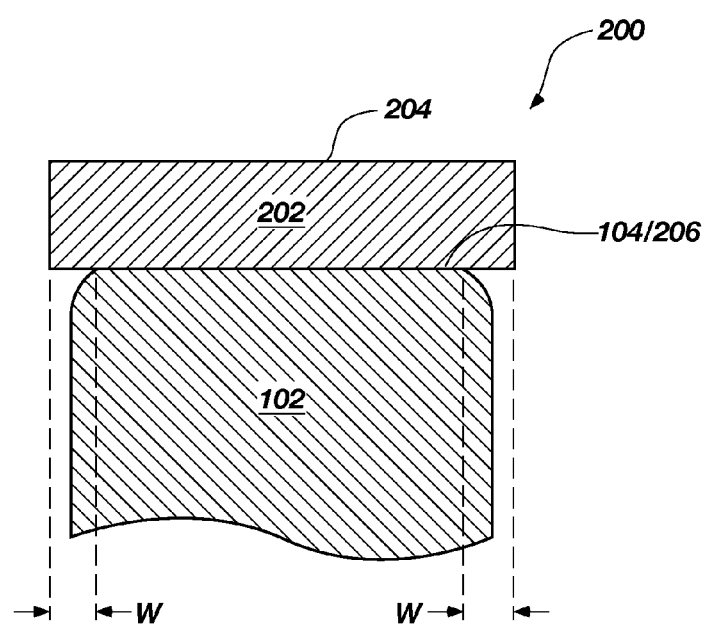
FIG. 2B is an enlarged cross-sectional view of the PDC shown in FIG. 2A.

Unlike a non-cylindrical PDC formed by sintering a cylindrical PDC and defining the non-cylindrical geometry via electro-discharge machining ("EDM") of significant amounts of material therefrom, the periphery 108 and periphery 208 are not defined by EDM. Consequently, the periphery 108 of the cemented carbide substrate 102 does not exhibit substantial undercutting that occurs when a cylindrical PDC is fabricated by EDM to form a non-cylindrical PDC. During EDM, the cemented carbide substrate is preferentially removed at a greater rate than a PCD table so that an undercut of about 0.0010 inch to about 0.002 inch is formed depending upon EDM parameters, metal-solvent-catalyst content, and other factors. Referring to FIG. 2B, which is an enlarged cross-sectional view of the PDC 200, instead, the periphery 108 of the cemented carbide substrate 102 is not substantially undercut from the PCD table 202. For example, the periphery 108 of the cemented carbide substrate 102 may only be slightly undercut from the PCD table 202 by a distance W of less than about 0.0020 inch, such as about 0 inch to about 0.0020 inch, about 0.00050 inch to about 0.0020 inch, or about 0.0008 inch to about 0.0015 inch. When undercutting is present, the amount of undercutting is typically most significant at or near the interfacial surface 104 of the cemented carbide substrate 102. Additionally, because the periphery 108 and periphery 208 are not defined by EDM, the cementing constituent (e.g., a cobalt) of the cemented carbide substrate 102 is not depleted, which can reduce the brazeability the cemented carbide substrate 102 to, for example, a bit body of a rotary drill bit. Thus, the periphery 108 of the cemented carbide substrate 102 lacks a so-called "re-cast layer" formed by and characteristic of EDM processing.

Figure 3A:
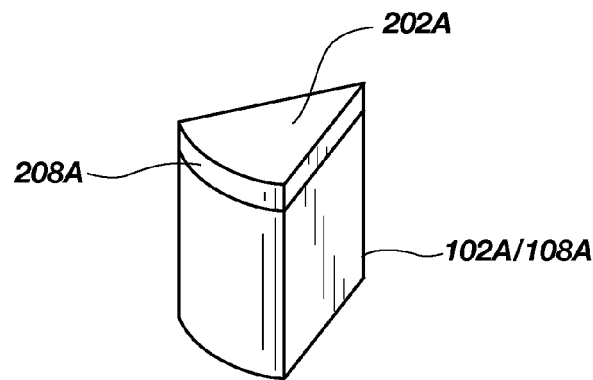
FIG. 3A is an isometric view of a wedge-shaped PCD table according to an embodiment.
Figure 3B:
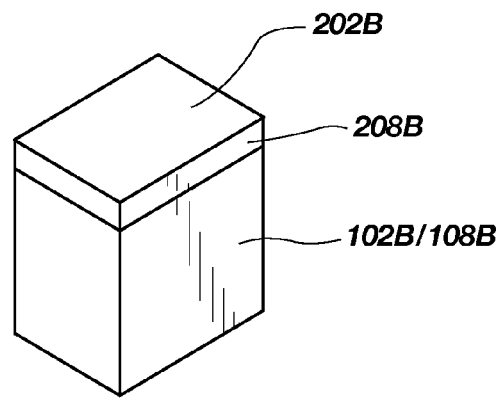
FIG. 3B is an isometric view of a rectangular-shaped PCD table according to an embodiment.
Figure 3C:
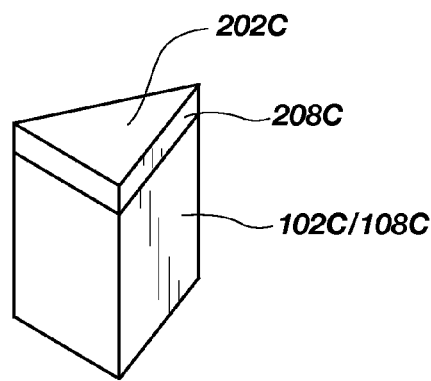
FIG. 3C is an isometric view of a triangular-shaped PCD table according to an embodiment.

Referring to FIGS. 3A-3C, although the cemented carbide substrate 102 and the PCD table 202 so-formed are illustrated in FIGS. 2A and 2B as being generally elliptical, with the periphery 108 and the periphery 208 defining a generally elliptical surface, the cemented carbide substrate 102 and the PCD table 202 may exhibit a number of other non-cylindrical geometries, such as a wedge-shaped geometry, a rectangular geometry, a triangular geometry, a spline geometry, or another selected non-cylindrical geometry. For example, the generally elliptical surface may exhibit an eccentricity of greater than 0 to about 0.90, about 0.50 to about 0.85, or about 0.60 to about 0.75. FIG. 3A is an isometric view of a wedge-shaped PCD table 202A according to an embodiment. In such an embodiment, a table periphery 208A of the PCD table 202A and a substrate periphery 108A of cemented carbide substrate 102A may define a wedge-shaped geometry. The corners of the wedge may be sharp, as illustrated, or filleted.

FIG. 3B is an isometric view of a rectangular-shaped PCD table 202B according to an embodiment. In such an embodiment, a table periphery 208B of the PCD table 202B and a substrate periphery 108B of cemented carbide substrate 102B may define a rectangle. The corners of the rectangle may be sharp, as illustrated, or filleted.

FIG. 3C is an isometric view of a triangular-shaped PCD table 202C according to an embodiment. In such an embodiment, a table periphery 208C of the PCD table 202C and a substrate periphery 108C of cemented carbide substrate 102C may define a triangle. The corners of the triangle may be sharp, as illustrated, or filleted.

In the described embodiments in FIGS. 1A-1D, the diamond particles 110 are sintered under HPHT conditions to integrally form the PCD table 202 (FIG. 2A) with the cemented carbide substrate 102. However, in other embodiments the diamond particles 110 may be replaced with an at least partially leached PCD table that may also exhibit any of the disclosed non-cylindrical geometries. Subjecting the at least partially leached PCD table and the cemented carbide substrate 102 to the HPHT process causes metal-solvent catalyst from the cemented carbide substrate 102 to at least partially infiltrate into and fill interstitial regions of the at least partially leached PCD table to form an infiltrated PCD table (i.e., a pre-sintered PCD table).

Figure 4A:
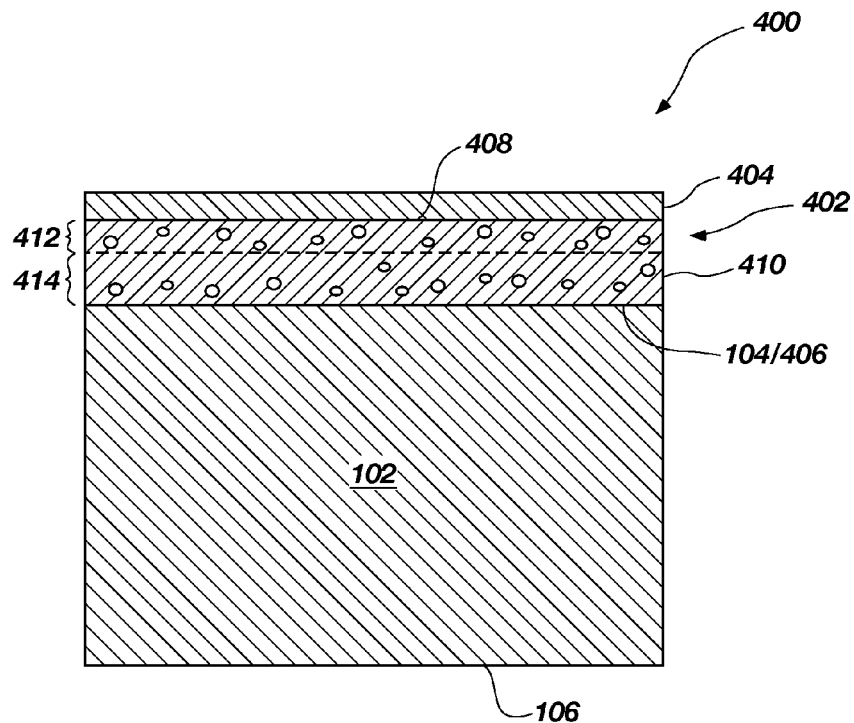
FIG. 4A is a cross-sectional view of an embodiment of an assembly to be HPHT processed that includes a non-cylindrical at least partially leached PCD table.

Referring to FIG. 4A, in an embodiment, an assembly 400 may be formed by positioning an at least partially leached PCD table 402 between the cemented carbide substrate 102 and a layer of infiltrant material 404. The at least partially leached PCD table 402 includes an interfacial surface 406 positioned adjacent to the interfacial surface 104 of the cemented carbide substrate 102, an upper surface 408 positioned adjacent to the layer of infiltrant material 404, and a non-cylindrical lateral periphery 410.

Referring to MG. 4B, in such an embodiment, the infiltrant material may infiltrate a first region 412 of the at least partially leached PCD table during HPHT processing prior to, after, or substantially simultaneous with the metal-solvent catalyst from the cemented carbide substrate 102 infiltrating into a second region 414 of the at least partially leached PCD table to form a PDC 416. For example, the infiltrant material may comprise silicon, a mixture of silicon and cobalt, a nonmetallic catalyst, or combinations of the foregoing. The nonmetallic catalyst may be selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous, a chloride (e.g., one or more chlorides of Li, Na, and K), elemental sulfur, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. For example, one suitable carbonate catalyst is an alkali metal carbonate material including a mixture of sodium carbonate, lithium carbonate, and potassium carbonate that form a low-melting ternary eutectic system. This mixture and other suitable alkali metal carbonate materials are disclosed in U.S. patent application Ser. No. 12/185,457, which is incorporated herein, in its entirety, by this reference. The alkali metal carbonate material disposed in the interstitial regions of the first region may be partially or substantially completely converted to one or more corresponding alkali metal oxides by suitable heat treatment following infiltration.

In other embodiments, the infiltrant material 404 may be omitted and a metal-solvent catalyst from the cemented carbide substrate 102 (e.g., cobalt) or another source may infiltrate into and fill interstitial regions of the first region 412 and second region 414 of the at least partially leached PCD table 402. The infiltration of the at least partially leached PCD table 402 with the metal-solvent catalyst may promote further nucleation and growth of diamond between existing diamond grains of the at least partially leached PCD table 402. Such increased diamond-to-diamond bonding may enhance wear resistance and/or thermal stability of the infiltrated PCD table. In an embodiment, the infiltrated PCD table may be subjected to a leaching process to remove the infiltrated metal-solvent catalyst from at least part of the first region 412 and/or at least part of the second region 414.

In another embodiment, the at least partially leached PCD table 402 may be brazed to the cemented carbide substrate 102. For example, the at least partially leached PCD table 402 may be brazed to the cemented carbide substrate 102 brazed in a vacuum brazing process, an atmospheric brazing process, or an HPHT brazing process.

The at least partially leached PCD table 402 may be fabricated by subjecting a plurality of diamond particles to an HPHT sintering process under diamond-stable conditions in the presence of the metallic catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metallic catalyst may be mixed with the diamond particles or infiltrated from a metallic catalyst foil or powder adjacent to the diamond particles. The bonded diamond grains define interstitial regions, with the metallic catalyst disposed within the interstitial regions. The diamond particles may exhibit a single-mode diamond particle size distribution, or a bimodal or greater diamond particle size distribution.

The as-sintered PCD body may be leached by immersion in an acid, such as aqua regia, nitric acid, hydrofluoric acid, mixtures of the foregoing, or subjected to another suitable process to remove at least a portion of the metallic catalyst from the interstitial regions of the PCD body and form the at least partially leached PCD table 402. For example, the as-sintered PCD body may be immersed in the acid for about 2 to about 7 days (e.g., about 3, 5, or 7 days) or for a few weeks (e.g., about 4 weeks) depending on the process employed. It is noted that when the metallic catalyst is infiltrated into the diamond particles from a cemented tungsten carbide substrate including tungsten carbide particles cemented with a metallic catalyst (e.g., cobalt, nickel, iron, or alloys thereof), the infiltrated metallic catalyst may carry a tungsten-containing material (e.g., tungsten and/or tungsten carbide) therewith and the as-sintered PCD body may include such tungsten-containing material therein disposed interstitially between the bonded diamond grains. Depending upon the leaching process, at least a portion of the tungsten-containing material may not be substantially removed by the leaching process and may enhance the wear resistance of the at least partially leached PCD table.

The at least partially leached PCD table 402 may be subjected to a shaping process after leaching, such as grinding or lapping, to tailor the non-cylindrical geometry thereof. The as-sintered PCD body may also be shaped prior to leaching by a machining process, such as electro-discharge machining.

Figure 4B:
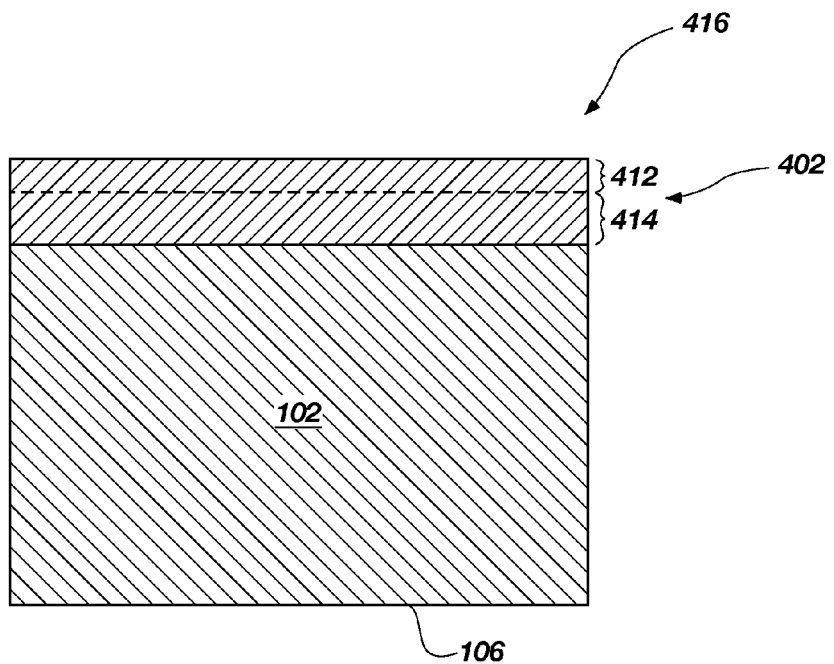
FIG. 4B is a cross-sectional view of a non-cylindrical PDC formed by HPHT processing the assembly shown in FIG. 4A.

The diamond particles 110 (FIGS. 1A and 1B) or the diamond particles used to form the at least partially leached PCD table 402 (FIGS. 4A and 4B) may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also comprise three or more different sizes (e.g., one relatively larger size and two or more relatively smaller sizes) without limitation.

Figure 5A:
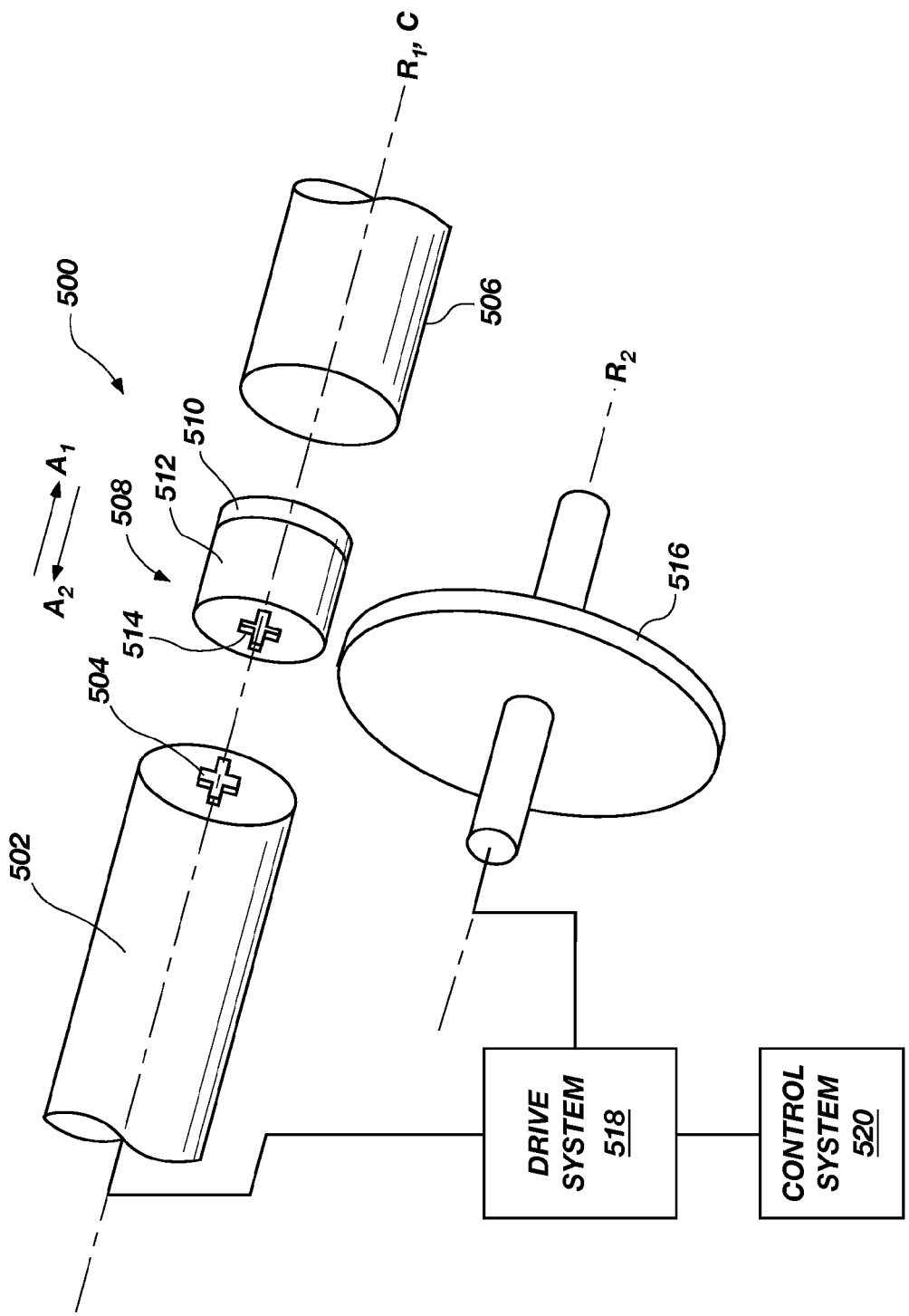
FIG. 5A is a schematic isometric view of an embodiment of a machining apparatus configured to perform finish machining on the precursor PDC shown in FIG. 2A.
Figure 5B:
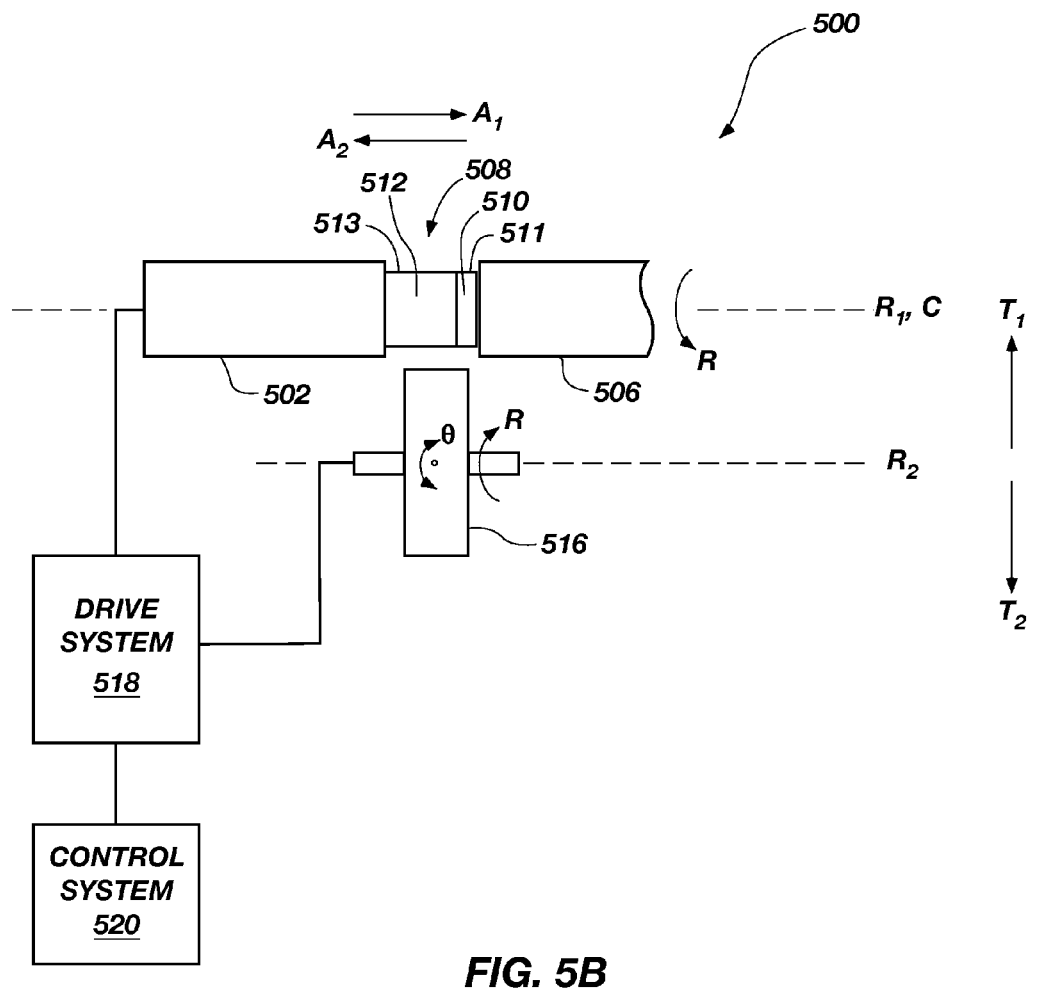
FIG. 5B is a schematic top plan view of the machining apparatus shown in FIG. 5A.

FIGS. 5A and 5B illustrate a machining apparatus 500 and related process for finish machining any of the disclosed precursor non-cylindrical PDCs, such as the PDCs shown in FIGS. 2A, 3A-3C, and 4B. FIGS. 5A and 5B are schematic isometric and top plan views, respectively, of an embodiment of the machining apparatus 500 configured to perform finish machining on the precursor PDC shown in FIG. 2A. The machining apparatus 500 includes a jig portion 502 including at least one alignment feature 504 and a jig portion 506. The jig portions 502 and 506 are movable relative to each other in axial directions $A_1$ and $A_2$ so that a precursor PDC 508 may be held securely therebetween. The precursor PDC 508 is used to represent any of the precursor non-cylindrical PDCs disclosed herein. For example, the precursor PDC 508 includes a PCD table 510 bonded to a cemented carbide substrate 512 having at least one alignment feature 514 (e.g., a recess) configured to correspond to the geometry of the at least one alignment feature 504 on the jig portion 502. The PCD table 510 has a table non-cylindrical periphery 511 and the cemented carbide substrate 512 has a substrate non-cylindrical periphery 513. However, in an embodiment, the jig portion 502 may having an abrasive surface instead of the at least one alignment feature 504 and the cemented carbide substrate 512 may lack the at least one alignment feature 514 or the at least one alignment feature 514 may be a visual alignment feature such as a marking.

The machining apparatus 500 further includes a machining element, such as an abrasive grinding wheel 516. For example, the abrasive grinding wheel may be a diamond-impregnated grinding wheel. A drive system 518 is operably coupled to the jig portions 502 and 506. The drive system 518 is configured to rotate the jig portions 502 and 506, with the precursor PDC 508 held therebetween, about a rotation axis $R_1$. The at least one alignment feature 504 of the jig portion 502 and the at least one alignment feature 514 of the precursor PDC 508 are positioned so that a central axis C of the precursor PDC 508 is maintained in substantial alignment with the rotation axis $R_1$. Thus, the at least one alignment feature 514 may be used to locate the central axis of the precursor PDC 508. The drive system 518 is also operably coupled to the abrasive grinding wheel 516. The drive system 518 is configured to rotate the abrasive grinding wheel 516 about a rotation axis $R_2$ and move the abrasive grinding wheel 516 in directions $T_1$ and $T_2$. A control system 520 may be coupled to the drive system 518 that controls the operation thereof.

In operation, one or both of the jig portions 502 and 506 are moved together to hold the precursor PDC 508 securely therebetween, with the central axis C of the precursor PDC 508 generally aligned with the rotation axis $R_1$ and the at least one alignment feature 514 of the PDC 508 in engagement with the at least one alignment feature of the jig portion 502. The drive system 518 moves the abrasive grinding wheel 516 in the direction $T_1$ to engage the precursor PDC 508. After, prior to, or substantially simultaneously with moving the abrasive grinding wheel 516 into engagement, the drive system 518 may rotate the abrasive grinding wheel 516 about the rotation axis $R_2$ to machine the precursor PDC 508 to finish machining dimensions. In an embodiment, the abrasive grinding wheel 516 may be rotatable a selected angle θ (FIG. 5B) about an axis generally perpendicular to the rotation axes $R_1$ and $R_2$ so that a selected chamfer may be formed in the PCD table 510 of the PDC 508.

Figure 6:
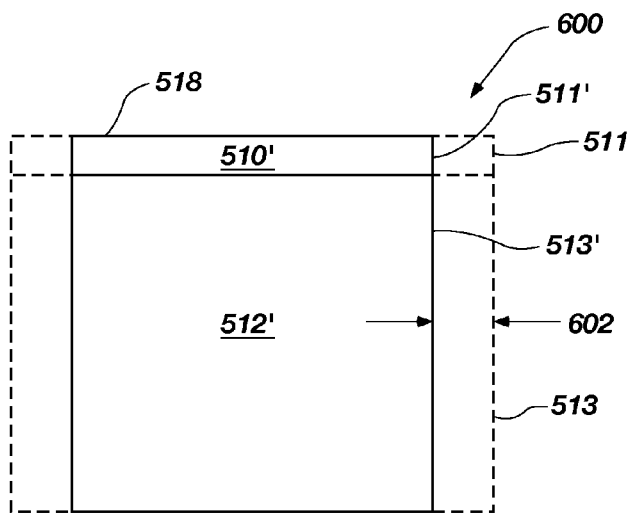
FIG. 6 is a cross-sectional view of a precursor PDC overlying a finished non-cylindrical PDC formed by machining the precursor PDC using the machining apparatus shown in FIGS. 5A and 5B.

FIG. 6 is a cross-sectional view of the precursor PDC 508 overlying a finished non-cylindrical PDC 600 formed by machining, the precursor PDC 508 using the machining apparatus shown in FIGS. 5A and 5B. As shown, a thickness 602 of material from the PCD table 510 and the cemented carbide substrate 512 may be ground away by the abrasive grinding wheel 516 to form the finished non-cylindrical PDC 600. The finished non-cylindrical PDC 600 includes a finished PCD table 510' having a finished table non-cylindrical periphery 511 and a finished cemented carbide substrate 512' having a finished substrate non-cylindrical periphery 513'. The thickness 602 removed from the precursor PDC 508 may be about 0.015 inch to about 0.080 inch, such as about 0.030 inch to about 0.060 inch. In general, the finished non-cylindrical PDC 600 has the same general non-cylindrical configuration as the precursor PDC 508 except that a small amount of material (i.e., the thickness 602 of material) has been removed therefrom. In some embodiments, the at least one alignment feature 514 (FIG. 5A) may be removed in a separate grinding operation after forming the PDC 600, if desired or necessary for a particular application. In other embodiments, the at least one alignment feature 514 is not removed and, when structured as a keyhole, the at least one alignment feature 514 may function as a braze material reservoir for brazing the PDC 600 to a bit body of a drill bit.

If the finished cemented carbide substrate 512' is undercut from the finished PCD table 510' after machining, the undercutting is not substantial and may be less than about 0.0020 inch, such as about 0 inch to about 0.0020 inch, about 0.00050 inch to about 0.0020 inch or about 0.0008 inch to about 0.0015 inch. The extent of the undercutting (if any) may be dependent on the grain size and/or abrasion resistance of the finished PCD table 510'.

For some applications, a non-cylindrical lateral periphery 514 of the finished PCD table 510' and a non-cylindrical lateral periphery 516 of the finished cemented carbide substrate 512' may be finish machined so that they are tapered relative to an upper working surface 518 of the finished PCD table 510'.

Other types of finish machining operations may be performed on the precursor PDC 508 as an alternative to or in addition to grinding using the machining apparatus 500. For example, finishing machining may be performed on the precursor PDC 508 using EDM, laser machining, honing, lapping, polishing, chemical-mechanical polishing, electrical discharge grinding, chemical/mechanical grinding, ultrasonic machining, or combinations of the foregoing. When EDM finish machining is used, the EDM machining parameters and the thickness 602 of material to be removed are chosen to prevent substantial undercutting.

It is noted that in some applications the finish machining operation may be omitted. For example, in some embodiments, when the dimensions of the precursor PDC 508 are sufficiently accurate for a particular application, the finishing operation may be eliminated, thereby reducing manufacturing cost and time.

In some embodiments, the finished PCD table 510' of the finished non-cylindrical PDC 600 may be leached to remove the metal-solvent catalyst therefrom (when present) to a selected depth. For example, the selected leaching depth may be about 5 μm to about 500 such as about 50 μm to about 100 μm. In other embodiments, the leaching process may be performed on the PCD table 510 of the precursor PDC 508 prior to the final machining operation.

In a further embodiment, a cylindrical PDC may be re-worked to different dimensions and/or geometry. For example, one or more alignment features may be machined in a back surface of a cemented carbide substrate that carries a PCD table. The one or more alignment features may be used in conjunction with the jig portion 502 and the cylindrical PDC may be finished machined to a non-cylindrical geometry. For example, a cylindrical PDC may be machined to an elliptical geometry.

Figure 7A:
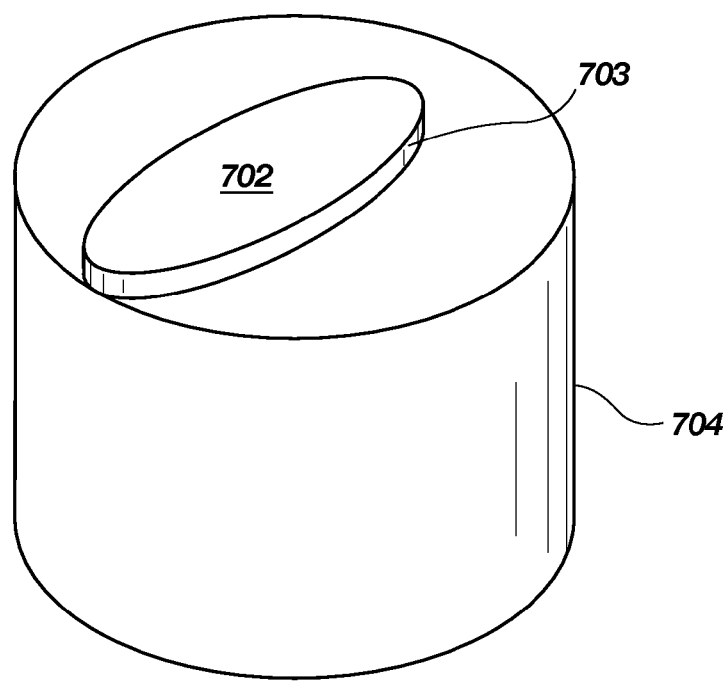
FIG. 7A is an isometric view of another embodiment of a precursor PDC.
Figure 7B:
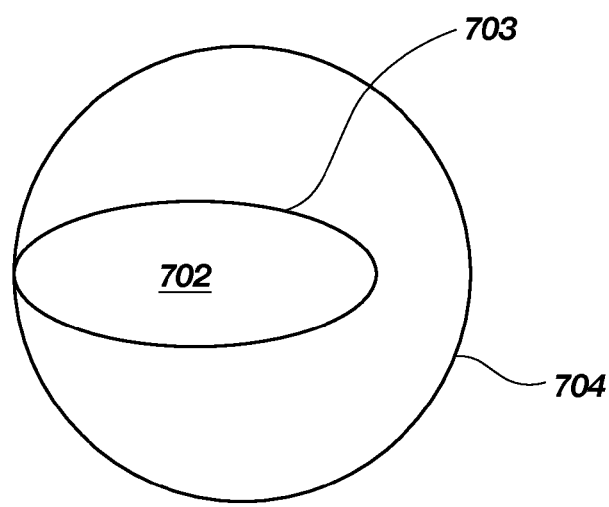
FIG. 7B is a top plan view of the precursor PDC shown in FIG. 7A.

In other embodiments, a precursor PDC may include one or more non-cylindrical PCD tables (e.g., one, two, or three non-cylindrical PCD tables) and a generally cylindrical cemented carbide substrate. FIGS. 7A and 7B are isometric and top plan views, respectively, of a precursor PDC 700 according to an embodiment. The precursor PDC 700 includes a non-cylindrical PCD table 702 having a non-cylindrical lateral periphery 703. The PCD table 702 is bonded to a generally cylindrical cemented carbide substrate 704 in an HPHT process or by brazing. For example, the PCD table 702 may be integrally formed with the cemented carbide substrate 704 in an HPHT process or may be an at least partially leached PCD table that is at least partially infiltrated with a constituent of the cemented carbide substrate 704 or a braze material. The PCD table 702 may exhibit any of the non-cylindrical geometries disclosed herein.

The cemented carbide substrate 704 of the precursor PDC 700 may be subjected to a finish machining operation using, for example, the machining apparatus 500 shown in FIGS. 5A and 5B to remove excess material of the cemented carbide substrate 704 until a lateral periphery of the cemented carbide substrate 704 and the periphery 703 of the PCD table 702 are in substantial alignment, such as in the PDC 600.

Figure 8:
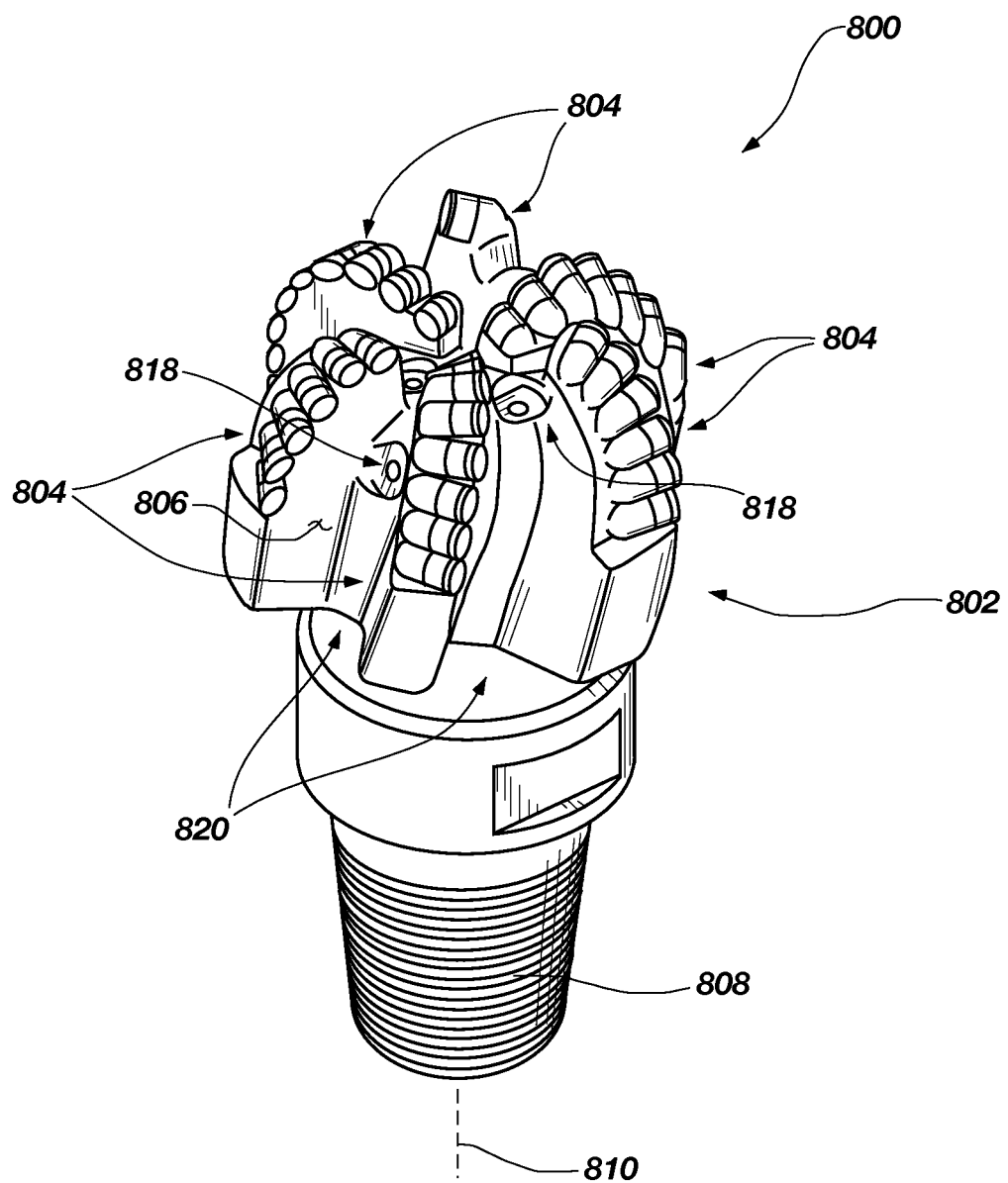
FIG. 8 is an isometric view of an embodiment of a rotary drill bit that may employ one or more of the disclosed non-cylindrical PDC embodiments.
Figure 9:
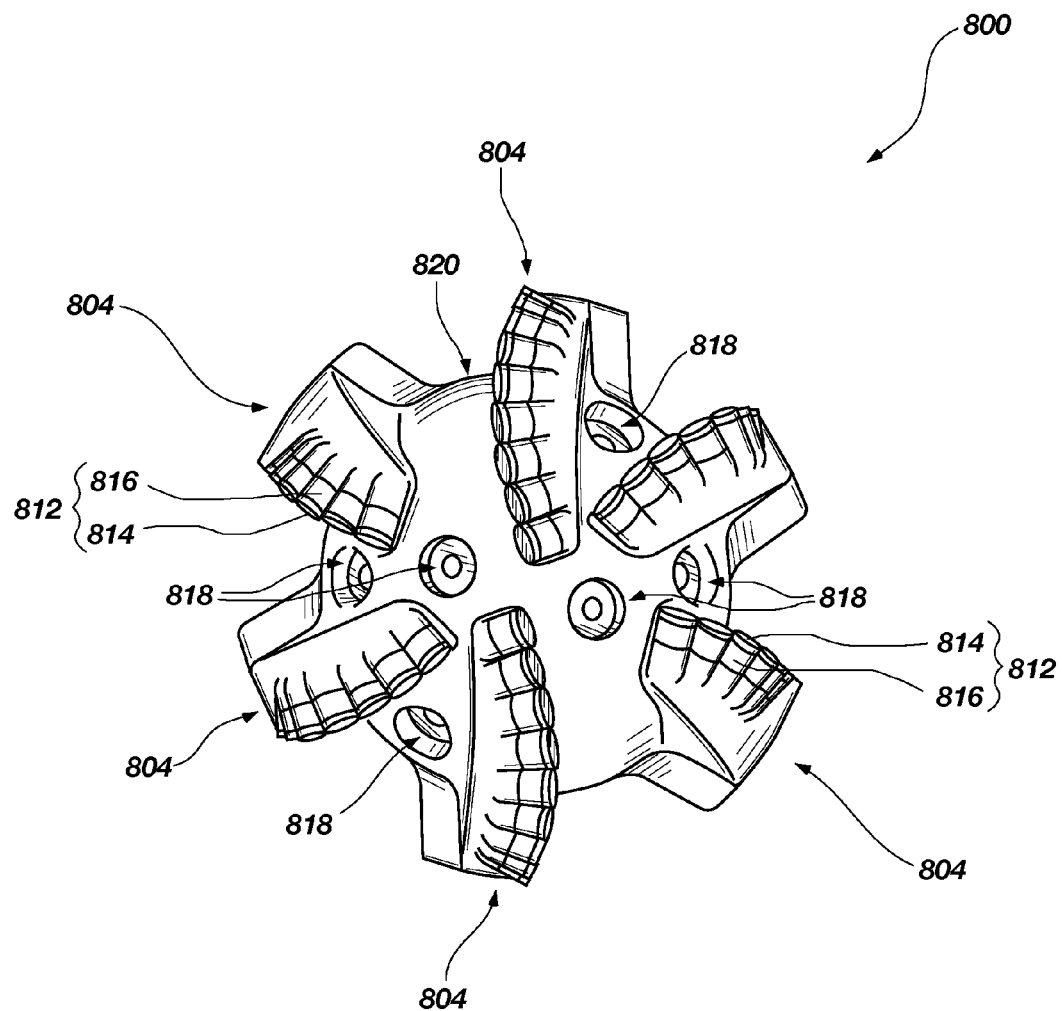
FIG. 9 is a top elevation view of the rotary drill bit shown in FIG. 8.

FIG. 8 is an isometric view and FIG. 9 is a top elevation view of an embodiment of a rotary drill bit 800 that includes at least one non-cylindrical PDC configured according to any of the disclosed non-cylindrical PDC embodiments. The rotary drill bit 800 comprises a bit body 802 that includes radially and longitudinally extending blades 804 having leading faces 806, and a threaded pin connection 808 for connecting the bit body 802 to a drilling string. The bit body 802 defines a leading end structure for drilling into a subterranean formation by rotation about a longitudinal axis 810 and application of weight-on-bit. At least one non-cylindrical PDC, configured according to any of the previously described non-cylindrical PDC embodiments, may be affixed to the bit body 802. With reference to FIG. 9, a plurality of PDCs 812 are secured to the blades 804 of the bit body 802. For example, each PDC 812 may include a PCD table 814 bonded to a substrate 816. More generally, the PDCs 812 may comprise any finished non-cylindrical PDC disclosed herein, without limitation. In addition, if desired, in some embodiments, a number of the PDCs 812 may be conventional in construction. Also, circumferentially adjacent blades 804 define so-called junk slots 820 therebetween. Additionally, the rotary drill bit 800 includes a plurality of nozzle cavities 818 for communicating drilling fluid from the interior of the rotary drill bit 800 to the PDCs 812.

FIGS. 8 and 9 merely depict one embodiment of a rotary drill bit that employs at least one non-cylindrical PDC fabricated and structured in accordance with the disclosed embodiments, without limitation. The rotary drill bit 800 is used to represent any number of earth-boring tools or drilling tools, including, for example, core bits, roller-cone bits, fixed-cutter bits, eccentric bits, bicenter bits, reamers, reamer wings, any other downhole tool including superabrasive compacts, or twist helical drills, without limitation.

The non-cylindrical PDCs disclosed herein (e g non-cylindrical PDC 600 of FIG. 6) may also be utilized in applications other than cutting technology. For example, the disclosed non-cylindrical PDC embodiments may be used in wire dies, bearings, artificial joints, inserts, cutting elements, and heat sinks. Thus, any of the non-cylindrical PDCs disclosed herein may be employed in an article of manufacture including at least one superabrasive element or compact.

Thus, the embodiments of non-cylindrical PDCs disclosed herein may be used in any apparatus or structure in which at least one conventional PDC is typically used. In one embodiment, a rotor and a stator, assembled to form a thrust-bearing apparatus, may each include one or more non-cylindrical PDCs (e.g., non-cylindrical PDC 600 of FIG. 6) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of non-cylindrical PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the non-cylindrical PDCs disclosed herein are disclosed in U.S. Pat. Nos. 4,811,801, 4,274,900; 4,268,276, 4,468,138; 4,738,322; 4,913,247; 5,016,718; 5,092,687; 5,120,327; 5,135,061; 5,154,245, 5,180,022, 5,460,233; 5,544,713, and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of manufacturing a finished polycrystalline diamond compact, comprising:
    forming a precursor polycrystalline diamond compact in a high-pressure/high-temperature process, wherein the precursor polycrystalline diamond compact includes a polycrystalline diamond table defining an upper surface and a table non-cylindrical lateral periphery, and a cemented carbide substrate bonded to the polycrystalline diamond table that includes a substrate non-cylindrical lateral periphery, an interfacial surface bonded to the polycrystalline diamond table, and a back surface spaced from the interfacial surface, the back surface having at least one alignment feature, the at least one alignment feature including a recess at least partially defined by the back surface or a projection extending from the back surface;
    engaging the at least one alignment feature of the cemented carbide substrate of the precursor polycrystalline diamond compact; and
    while the at least one alignment feature is engaged, finish machining at least the substrate non-cylindrical lateral periphery to form the finished polycrystalline diamond compact.

2. The method of claim 1 wherein finish machining at least the substrate non-cylindrical lateral periphery to form the finished polycrystalline diamond compact comprises grinding material from at least the substrate non-cylindrical lateral periphery.

3. The method of claim 1 wherein finish machining at least the substrate non-cylindrical lateral periphery to form the finished polycrystalline diamond compact comprises grinding about 0.015 inch to about 0.080 inch of material from at least the substrate non-cylindrical lateral periphery.

4. The method of claim 1 wherein finish machining at least the substrate non-cylindrical lateral periphery to form the finished polycrystalline diamond compact while the at least one alignment feature is engaged comprises grinding material from at least the substrate non-cylindrical lateral periphery while the at least one alignment feature is engaged.

5. The method of claim 1, further comprising:
    positioning a generally central axis of the precursor polycrystalline diamond compact relative to a machining element; and
    wherein finish machining at least the substrate non-cylindrical lateral periphery to form the finished polycrystalline diamond compact comprises grinding material from at least the substrate non-cylindrical lateral periphery along a machining path generally centered about the generally central axis using the machining element.

6. The method of claim 1 wherein finish machining at least the substrate non-cylindrical lateral periphery comprises finish machining the table non-cylindrical lateral periphery and a substrate non-cylindrical lateral periphery of the cemented carbide substrate.

7. The method of claim 1 wherein finish machining at least the substrate non-cylindrical lateral periphery to form the finished polycrystalline diamond compact comprises grinding, electro-discharge machining, laser machining, honing, lapping, polishing, chemical-mechanical polishing, electrical discharge grinding, chemical/mechanical grinding, ultrasonic machining, or combinations of the foregoing.

8. The method of claim 1 wherein finish machining at least the substrate non-cylindrical lateral periphery comprises finish machining the table non-cylindrical lateral periphery and a substrate non-cylindrical lateral periphery of the cemented carbide substrate in a manner that, after machining, the substrate non-cylindrical lateral periphery is undercut from the polycrystalline diamond table by less than about 0.0020 inch.

9. The method of claim 8 wherein, after finish machining, the substrate non-cylindrical lateral periphery is undercut from the polycrystalline diamond table by about 0.00050 inch to about 0.0020 inch.

10. The method of claim 8 wherein the substrate non-cylindrical lateral periphery is free of an electro-discharge-machined re-cast layer.

11. The method of claim 1 wherein the at least one alignment feature includes the projection having at least one key extending from the back surface of the cemented carbide substrate.

12. A method of manufacturing a finished polycrystalline diamond compact, comprising:
    forming a precursor polycrystalline diamond compact in a high-pressure/high-temperature process, wherein the precursor polycrystalline diamond compact includes a polycrystalline diamond table defining an upper surface and a table non-cylindrical lateral periphery, and a cemented carbide substrate including an interfacial surface bonded to the polycrystalline diamond table, a back surface spaced from the interfacial surface, and substrate non-cylindrical lateral periphery, the back surface having at least one alignment feature;

substantially aligning a general central axis of the precursor polycrystalline diamond compact with a rotation axis of a machining apparatus by at least partially contacting the at least one alignment feature with a corresponding feature of the machining apparatus; and while the central axis and the rotation axis are substantially aligned, grinding the table non-cylindrical lateral periphery and the substrate non-cylindrical lateral periphery of the precursor polycrystalline diamond compact using the machining apparatus, while undercutting the substrate non-cylindrical lateral periphery from the table non-cylindrical lateral periphery by less than 0.0020 inch, to form the finished polycrystalline diamond compact.

13. The method of claim 12 wherein the substrate non-cylindrical lateral periphery is undercut from the polycrystalline diamond table by about 0.00050 inch to about 0.0020 inch.

14. The method of claim 12 wherein the substrate non-cylindrical lateral periphery is free of an electro-discharge-machined re-cast layer.

15. The method of claim 12 wherein the at least one alignment feature includes a recess at least partially defined by the back surface or a projection extending from the back surface.

* * * * *